(12) United States Patent
Leuschner

(10) Patent No.: US 11,747,489 B2
(45) Date of Patent: Sep. 5, 2023

(54) DOSIMETER

(71) Applicant: Deutsches Elektronen-Synchrotron DESY, Hamburg (DE)

(72) Inventor: Albrecht Leuschner, Hamburg (DE)

(73) Assignee: Deutsches Elektronen-Synchrotron DESY, Hamburg (DE)

( * ) Notice: Subject to any disclaimer, the term of this patent is extended or adjusted under 35 U.S.C. 154(b) by 0 days.

(21) Appl. No.: 17/557,811

(22) Filed: Dec. 21, 2021

(65) Prior Publication Data

US 2022/0196853 A1 Jun. 23, 2022

(30) Foreign Application Priority Data

Dec. 22, 2020 (EP) .................... 20216342

(51) Int. Cl.
*G01T 1/10* (2006.01)
*G01N 21/64* (2006.01)
*G01T 1/02* (2006.01)

(52) U.S. Cl.
CPC ............... *G01T 1/10* (2013.01); *G01N 21/64* (2013.01); *G01T 1/023* (2013.01); *G01N 2021/6497* (2013.01)

(58) Field of Classification Search
CPC ........... G01T 1/10; G01T 1/023; G01N 21/64; G01N 2021/6497
See application file for complete search history.

(56) References Cited

U.S. PATENT DOCUMENTS

| 10,386,499 | B2 * | 8/2019 | Jung ........................ G01T 1/023 |
| 2009/0014665 | A1 | 1/2009 | Fleming et al. |

FOREIGN PATENT DOCUMENTS

| DE | 102012108174 A1 | 3/2014 |
| EP | 0754305 A1 | 1/1997 |
| EP | 1078282 A1 | 2/2001 |
| EP | 3173823 A1 | 5/2017 |
| EP | 3489722 A1 | 5/2019 |
| EP | 3508886 A1 | 7/2019 |

OTHER PUBLICATIONS

"European Application Serial No. 20216342.4, European Search Report dated Jun. 16, 2021", (dated Jun. 16, 2021), 12 pgs.
Legall, Herbert, et al., "X-ray radiation protection aspects during ultrashort laser processing", Journal of Laser Applications 32.2, (2020), 022004-1.

* cited by examiner

*Primary Examiner* — David P Porta
*Assistant Examiner* — Fani Polyzos Boosalis
(74) *Attorney, Agent, or Firm* — Schwegman Lundberg & Woessner, P.A.

(57) ABSTRACT

What is described and claimed is a dosimeter for measuring a radiation dose of ionizing radiation comprising a measurement chamber and a light sensor, wherein the measurement chamber is filled with a fluorophore and is lightproof, such that no light from the surroundings can be incident in the measurement chamber, and wherein the light sensor is configured to detect fluorescent light generated by ionizing radiation in the fluorophore in the measurement chamber and to generate a signal that is proportional to the fluence of the detected fluorescent light. Furthermore, the use of such a dosimeter, and a spectrometer comprising a plurality of such dosimeters are presented and claimed.

26 Claims, 1 Drawing Sheet

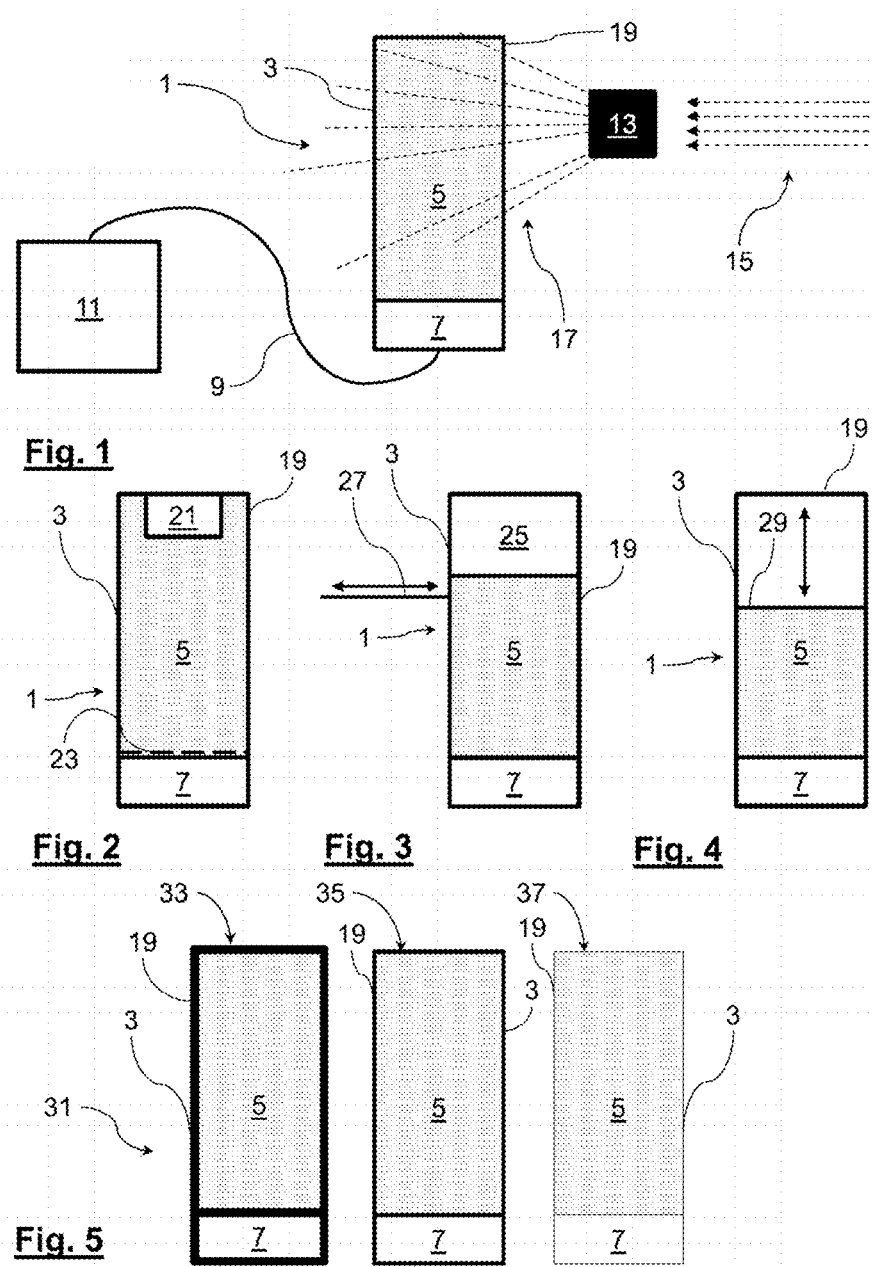

DOSIMETER

CLAIM OF PRIORITY

This application claims the benefit of priority of European Application Serial No. 20216342.4, filed Dec. 22, 2020, which is hereby incorporated by reference in its entirety.

TECHNICAL FIELD

The present invention relates to a dosimeter for measuring a radiation dose of ionizing radiation, to a use of such a dosimeter for measuring a radiation dose of an ionizing radiation, and to a spectrometer for determining an energy-dependant radiation dose for ionizing radiation with an initial energy spectrum comprising a plurality of such dosimeters.

BACKGROUND

A wide variety of different types of dosimeters are known for measuring radiation doses of ionizing radiation, such as photons or electrons, for example. By way of example, film dosimeters or thermoluminescent dosimeters (TLDs) are used for detecting radiation doses over relatively long periods of time. Ionization chambers, for example, are used for measuring the instantaneous radiation dose. An ionization chamber is a measurement chamber which is filled with a counting gas and in which electrodes are arranged, a high voltage being present between said electrodes. If ionizing radiation enters the chamber, the counting gas is ionized. The resultant charge carriers are collected at the electrodes and an electric current that is proportional to the dose power of the radiation can be measured.

Known dosimeters encounter their limits, however, when what is being measured is radiation doses that arise in very short time periods. By way of example, hitherto it has been technically extremely complicated to measure the instantaneous radiation dose of ionizing radiation that arises when a beam from an ultrashort pulse laser impinges on a workpiece, since the saturation limits and so-called "pile-up" make the measurement more difficult or lead to misinterpretations. It is similarly difficult to measure the dose of radiation that arises during a laser-induced acceleration of particles, such as during laser plasma acceleration, for example.

SUMMARY/OVERVIEW

In the present case, an ultrashort pulse laser is understood to mean a laser having a pulse duration in the range of picoseconds, femtoseconds or shorter. The radiation pulses that arise when such lasers are used are of similar duration. Known dosimeters for measuring temporally variable radiation doses or present radiation doses, such as ionization chambers, for example, cannot measure the dose of such short radiation pulses, or can measure it only inaccurately, since their temporal resolution is too low. By way of example, in one dosimeter, collecting the charge carriers at the electrodes already takes approximately 1 µs, i.e. a multiple of the duration of a radiation pulse generated by an ultrashort pulse laser. Moreover, on account of the short duration of the radiation pulse even in the case of comparatively low radiation doses the dose power is very high, such that saturation effects are of very great importance even in the case of small doses.

Against this background, the person skilled in the art establishes the object of providing an active, i.e. not an integrating, dosimeter for measuring radiation doses of pulsed ionizing radiation and also of specifying a method for using such a dosimeter and a spectrometer for determining an energy-dependant radiation dose.

The object on which the invention is based is achieved by means of a dosimeter according to claim 1, a method for using a dosimeter according to claim 11, and also a spectrometer according to claim 12. The respective dependant claims relate to preferred configurations of the various aspects of the invention.

In accordance with a first aspect, the problem on which the invention is based is solved by means of a dosimeter for measuring a radiation dose of ionizing radiation comprising a measurement chamber and a light sensor. The measurement chamber is filled with a fluorophore and is lightproof, such that no light from the surroundings can be incident in the measurement chamber. The light sensor is configured to detect fluorescent light generated by ionizing radiation in the fluorophore in the measurement chamber and to generate a signal that is proportional to the fluence of the detected fluorescent light.

In other words, a dosimeter according to the invention has a measurement chamber, in which a light sensor having a preferably very short response time is arranged. The measurement chamber is filled with a medium in which fluorescence can be excited by ionizing radiation. Such media are referred to as fluorophore in the present case. Preferably, the fluorophore is a gas. However, it is also conceivable to use a liquid or frosted glasses, i.e. a light-transmissive solid, as fluorophore. The measurement chamber is lightproof, i.e. configured such that no ambient light is incident in the measurement chamber and on the light sensor. This prevents ambient light from corrupting the measurement of the dose. For this purpose, the measurement chamber is regularly formed from a light-absorbing material or clad with such a material.

The radiation preferably has a pulsed time structure with a pulse duration of less than 1 nanosecond. As a result of this short time duration, the entire radiation that interacts with the gas in the measurement chamber in a radiation pulse passes through the measurement chamber in a very short time.

In order to measure a radiation dose, the chamber is arranged in a region in which the dose of an ionizing radiation is intended to be measured. By way of example, the measurement chamber can be arranged in the vicinity of an object which is processed by means of an ultrashort pulse laser having a pulse length in the range of a few picoseconds and preferably shorter. The ionizing radiation, for example x-ray radiation having an energy of 8 keV or higher, gamma radiation, high-energy neutrons, electrons, positrons or protons, penetrates through the wall of the measurement chamber and excites the fluorophore in the measurement chamber, which thereupon emits fluorescent light. The lifetime of the excited states in the fluorophore is approximately 0.5 ns, that is to say that fluorescent light is emitted approximately 0.5 ns after the ionizing radiation has excited the fluorophore. At low gas pressures, the lifetime of the excited states can increase to up to 20 ns.

The emitted fluorescent light is captured by the light detector in the measurement chamber and converted into an electrical signal that is proportional to the fluence of the detected fluorescent light and thus also proportional to the dose of the ionizing radiation that was incident in the chamber. On account of the short lifetime of the excited states in the fluorophore and the speed of light in the measurement chamber, in contrast to conventional dosimeters, such as ionization chambers, for example, no significant delay occurs during the measurement of the dose. Moreover, despite the high dose powers caused by the short pulse duration no relevant saturation occurs which could make it more difficult to measure the radiation dose. Consequently, the dosimeter is an actively measuring dosimeter, and thus not an integrating one, and can be used to measure the instantaneous radiation dose even in the case of very short radiation pulses.

In one preferred embodiment, the measurement chamber is filled with air, argon, nitrogen, carbon dioxide or methane as fluorophore. In the preferred embodiment, therefore, the measurement chamber is filled with a gas such as air or argon, for example. Particularly a measurement chamber filled with air affords significant advantages since this significantly facilitates handling.

It is further preferred if the light sensor has a response time of less than 10 ns and preferably of less than 5 ns, wherein the light sensor is preferably a photomultiplier or a semiconductor detector. Response time can be understood to mean for example the time from the incidence of a photon in the light detector until the presence of a corresponding signal at a signal output of the light sensor. In one exemplary embodiment, a signal is present at a signal output when for example 50% or 90% of the signal level is reached. A short response time enables an accurate measurement of the radiation dose despite short radiation pulses.

The measurement chamber is preferably formed from a metal, a plastic or a composite material. By way of example, the measurement chamber and, to put it more precisely, the wall of the measurement chamber can be formed from a carbon fibre-reinforced plastic. However, other materials are also conceivable. The wall of the measurement chamber can also be formed from different materials in different regions. By way of example, the measurement chamber can have reinforced regions, which absorb ionizing radiation to a greater extent, and thinner regions, in which ionizing radiation is absorbed to a lesser extent. Such regions can form a measurement window, for example, through which ionizing radiation (but not light) is incident in the measurement chamber and only the least possible portions of the radiation are absorbed.

In one preferred embodiment, the measurement chamber has a cylindrical shape. However, other configurations are also conceivable. By way of example, the measurement chamber can be of spherical or cubic shape.

It is furthermore preferred if a light source for calibrating the light sensor is arranged in the measurement chamber. For this purpose, a light source is used, for example, which emits light having a known fluence and preferably in the same wavelength range in which the fluorescent light generated by the ionizing radiation is also observed. The light sensor can be calibrated by means of the light source since, when the light source is switched on, the magnitude of the fluence of the incident photons on the light sensor is known and the ratio between a fluence of the photons incident on the light sensor and the output signal of the light sensor can thus be determined or set.

In one preferred embodiment, the light sensor comprises at least one optical attenuator which can be arranged in the measurement chamber such that the fluence of the fluorescent light incident on the light sensor is reduced by the optical attenuator. In this way, a saturation of the light sensor can be prevented and the measurement range of the dosimeter can be adapted to high radiation doses.

In one preferred embodiment, the measurement chamber is configured such that a volume of the measurement chamber can be changed in order to change a sensitivity of the dosimeter. In this preferred embodiment, the measurement chamber is filled with a gas or a fluid. By way of example, the volume of the measurement chamber can be changed by the use of a measurement chamber having flexible or extensible walls or it is possible for example to displace a moveable wall element in a chamber in order to adapt the volume of the actual measurement chamber. Changing the volume of the measurement chamber also changes the quantity of fluorophore with which the ionizing radiation can interact and thus the fluence of the fluorescent light generated by the radiation. In this regard, by way of example, it is possible to use a larger volume in order to measure low radiation doses more accurately, and a smaller volume in order to measure high radiation doses for which otherwise the light sensor would attain saturation on account of the quantity of fluorescent light generated.

Alternatively or additionally, the dosimeter can be embodied such that a pressure of the fluorophore can be changed in the measurement chamber in order to change the sensitivity of the dosimeter. Preferably, a fluorophore in the form of a gas or some other compressible fluid is used for this purpose.

In one preferred embodiment, besides the fluorophore a scintillator is arranged in the measurement chamber and the light sensor is configured to detect scintillation light generated by ionizing radiation in the scintillator and to generate a signal that is proportional to the fluence of the detected scintillation light. The use of scintillators for measuring radiation doses is sufficiently known to the person skilled in the art. By virtue of the arrangement of a scintillator in the measurement chamber, the dosimeter can advantageously be used even for measuring the radiation dose of an ionizing radiation for which not enough fluorescent light is generated for a dose measurement.

Preferably, the dosimeter comprises a screen, which can be arranged between the scintillator and the light sensor, such that no scintillation light generated by ionizing radiation in the scintillator is detected by the light sensor. In other words, the screen can be positioned between the scintillator and the light sensor such that no light from the scintillator is incident in the light sensor. It is thus possible to ensure that exclusively light generated by fluorescent processes can be measured by the light sensor. If light generated in the scintillator is also intended to be detected by the light sensor, the screen is removed.

In an alternative, preferred embodiment, the measurement chamber is completely filled with the fluorophore and no scintillator is arranged in the measurement chamber.

In a second aspect, a dosimeter according to any of the preceding claims is used for measuring a radiation dose of an ionizing radiation. The advantages of the use of a dosimeter according to the invention correspond to the advantages of the corresponding dosimeter.

In this case, it is preferred if the dosimeter is preferably used for measuring the radiation dose of a pulsed ionizing radiation having radiation pulses having a length of less than 10 ns, preferably of less than 5 ns, and even more preferably having a length of less than 1 ns.

In one preferred embodiment, the dosimeter is used for measuring the radiation dose of gamma radiation having an energy of more than 8 keV, preferably more than 10 keV.

In a third aspect, the problem on which the invention is based is solved by means of a spectrometer for determining an energy-dependant radiation dose for ionizing radiation with an initial energy spectrum comprising a plurality of dosimeters according to any of the preceding embodiments, wherein a wall of the measurement chamber of each dosimeter of the plurality of dosimeters has different absorption properties than a wall of at least one other dosimeter of the plurality of dosimeters, such that the ionizing radiation which generates fluorescent light in the measurement chamber of the respective dosimeter has an energy spectrum which differs both from the initial energy spectrum and from the energy spectrum of the ionizing radiation which generates fluorescent light in the measurement chamber of the at least one dosimeter having a wall having deviating absorption properties.

In other words, in the preferred embodiment, a plurality of dosimeters corresponding to at least one of the embodiments described above are combined in order to determine an energy dependence of the radiation dose. For this purpose, dosimeters are used in which, by virtue of walls having different absorption properties in at least two of the dosimeters used, radiation doses for radiations with different energy spectra are measured, such that a conclusion about the energy dependence of the radiation can be drawn from the difference between the radiation doses. Different absorption properties can be achieved for example by means of walls of different thicknesses or walls composed of different materials.

In one preferred embodiment, the wall of the measurement chamber of every dosimeter of the plurality of dosimeters has absorption properties which deviate from the absorption properties of the wall of the measurement chamber of every other dosimeter of the plurality of dosimeters. In other words, given an identical initial spectrum, each of the dosimeters measures a radiation dose for a different energy spectrum.

In one preferred embodiment, the walls of the measurement chambers of the plurality of dosimeters are formed from identical materials and deviating absorption properties are produced by deviating dimensions of the walls. Alternatively or supplementarily, the walls of the measurement chambers of the plurality of dosimeters are formed from different materials and therefore have deviating absorption properties.

The advantages of the various embodiments of a spectrometer correspond moreover to the advantages of the dosimeters which are used for the spectrometer.

BRIEF DESCRIPTION OF THE FIGURES

Several exemplary embodiments of a dosimeter and a spectrometer are described below with reference to the drawing, in which FIG. 1 shows a first exemplary embodiment of a dosimeter, FIG. 2 shows a second exemplary embodiment of a dosimeter, FIG. 3 shows a third exemplary embodiment of a dosimeter, FIG. 4 shows a fourth exemplary embodiment of a dosimeter, and FIG. 5 shows one exemplary embodiment of a spectrometer.

DETAILED DESCRIPTION

In FIGS. 1 to 5—unless indicated otherwise—identically designated elements are provided with the same reference signs.

FIG. 1 shows a first exemplary embodiment of a dosimeter 1, comprising a measurement chamber 3, which is filled with a fluorophore 5 and in which a light sensor 7 is arranged. In the exemplary embodiment in FIG. 1, the fluorophore is a gas, preferably air, which completely fills the measurement chamber 3. The measurement chamber 3 is formed from a lightproof plastic, such that no light from the surroundings is incident in the measurement chamber 3.

A photomultiplier having a response time of less than 5 ns is used as the light sensor 7. The light sensor 7 is connected to an evaluation unit 11 via a signal output 9, said evaluation unit being a data processing device, for example.

The dosimeter 1 is used to measure the radiation dose of a pulsed ionizing radiation having very short radiation pulses. The duration of the radiation pulses is less than 1 ns, for example. FIG. 1 schematically illustrates a workpiece 13 processed by means of an ultrashort pulse laser 15. In FIG. 1, the ultrashort pulse laser 15 is represented by dashed lines with arrowheads and has a pulse length in the range of a few femtoseconds. When the laser beam impinges on the workpiece 13, ionizing radiation 17 in the form of x-ray radiation 17 arises, which is represented by dashed lines in FIG. 1. The x-ray radiation 17 is likewise pulsed with a similar pulse length to that of the laser 15. Part of the x-ray radiation 17 penetrates through the wall 19 of the measurement chamber 3 and generates fluorescent light as a result of excitation of the fluorophore 5. The fluorescent light is captured by the light sensor 7, which is configured for this purpose and which outputs to the evaluation unit 11 via the signal output 9 a signal that is proportional to the detected fluorescent light and thus also proportional to the radiation dose of the incident ionizing radiation 17.

On account of the short lifetime of the excitation states in the fluorophore 5 of approximately 0.5 ns and the short response time of the light sensor 7, which is of the same temporal order of magnitude, the radiation dose can be measured by the sensor even in the case of—comparatively—high radiation doses over very short time periods, without saturation effects directly occurring.

FIG. 2 illustrates an alternative embodiment of a dosimeter 1 based on the dosimeter 1 from FIG. 1. The illustration of a signal output, an evaluation unit and a radiation source has been dispensed with. However, the dosimeter 1 from FIG. 2 can be connected to an evaluation unit via a signal output in a manner corresponding to the dosimeter 1 from FIG. 1. The dosimeter 1 illustrated in FIG. 2 is explained in greater detail below only in so far as it differs from the dosimeter illustrated in FIG. 1.

In addition to the dosimeter 1 from FIG. 1, the dosimeter 1 in FIG. 2 has a light source 21, which is arranged in the measurement chamber and can be used to calibrate the light sensor 7. Furthermore, FIG. 2 shows an optical attenuator 23, which can be arranged between the light sensor 7 and the fluorophore in order to reduce the fluence of the generated fluorescent light, such that even higher radiation doses can be measured, without saturation of the light sensor 7 occurring. In the exemplary embodiment, the optical attenuator 23 is embodied such that it can optionally be arranged upstream of the light sensor 7 or be removed again. The optical attenuator 23 and the light source 21 are independent of one another and can also be used in each case without the other component.

FIG. 3 illustrates an alternative embodiment of a dosimeter 1 based on the dosimeter 1 from FIG. 1. The illustration of a signal output, an evaluation unit and a radiation source has been dispensed with. However, the dosimeter 1 from FIG. 3 can be connected to an evaluation unit via a signal output in a manner corresponding to the dosimeter 1 from FIG. 1. The dosimeter 1 illustrated in FIG. 3 is explained in greater detail below only in so far as it differs from the dosimeter illustrated in FIG. 1.

In addition to the dosimeter 1 from FIG. 1, the dosimeter 1 in FIG. 3 comprises a scintillator 25, which is arranged in the measurement chamber and can be used to measure radiation doses of continuous radiation sources or pulsed radiation sources having significantly longer radiation pulses. The scintillation light generated by the ionizing radiation in the scintillator 25 is likewise received by the light sensor 7, which is configured for this purpose and which outputs at its signal output (not illustrated in FIG. 3) a signal that is proportional to the generated scintillation light and thus also proportional to the radiation dose. The use of scintillators 25 for dose measurement is sufficiently known to the person skilled in the art, and so a more detailed explanation is omitted here. In order to prevent scintillation light from corrupting the measurement results in the case of pulsed radiation sources, a screen 27 is provided, which can optionally be moved between the scintillator 25 and the fluorophore 5. The screen 27 prevents scintillation light from being incident on the light sensor 7 or being detected by the latter.

FIG. 4 illustrates an alternative embodiment of a dosimeter 1 based on the dosimeter 1 from FIG. 1. The illustration of a signal output, an evaluation unit and a radiation source has been dispensed with. However, the dosimeter 1 from FIG. 4 can be connected to an evaluation unit via a signal output in a manner corresponding to the dosimeter 1 from FIG. 1. The dosimeter 1 illustrated in FIG. 4 is explained in greater detail below only in so far as it differs from the dosimeter illustrated in FIG. 1.

In the exemplary embodiment illustrated in FIG. 4, a displaceable wall 29 is provided in the measurement chamber 3, by means of which displaceable wall the volume of the measurement chamber 3 in which the gaseous fluorophore is arranged can be changed. Changing the volume makes it possible to change the quantity of fluorescent light which is generated for the same radiation dose, and thus to adapt the sensitivity of the dosimeter to different radiation sources.

The embodiments in FIGS. 1 to 4 can be combined with one another, provided that this is not expressly excluded. Merely for the sake of completeness, it should be pointed out that the illustrated geometries and arrangements of the components of the dosimeters 1 are purely schematic and do not pose an obstacle for the combination of the embodiments.

Finally, FIG. 5 illustrates one exemplary embodiment of a spectrometer 31 comprising three dosimeters 33, 35, 37, each of which is constructed like the dosimeter 1 from FIG. 1. However, the dosimeters 33, 35, 37 could also be constructed like one of the dosimeters 1 from FIGS. 2, 3, 4. The dosimeters 33, 35, 37 differ from one another in terms of walls 19 of different thicknesses, as is indicated by lines of different thicknesses representing the walls 19. The illustration of the walls 19 is purely schematic, that is to say that the actual thickness of the walls 19 cannot be deduced from the thickness of the lines.

The walls 19 of different thicknesses have different absorption properties. In particular, thicker walls 19 absorb ionizing radiations having low energies to a proportionally greater extent than ionizing radiation having higher energies. This has the effect that in each dosimeter 33, 35, 37 despite an identical initial energy spectrum in the respective measurement chamber 3, radiation with a different energy spectrum interacts with the fluorophore 5. An energy dependence of the radiation dose of the ionizing radiation can thus be determined from a comparison of the radiation doses measured for the different energy spectra.

LIST OF REFERENCE SIGNS

1 dosimeter
3 measurement chamber
5 fluorophore
7 light sensor
9 signal output
11 evaluation unit
13 workpiece
15 ultrashort pulse laser
17 x-ray radiation
19 wall
21 light source
23 optical attenuator
25 scintillator
27 screen
29 moveable wall
31 spectrometer
33 dosimeter
35 dosimeter
37 dosimeter

The invention claimed is:

1. A dosimeter for measuring a radiation dose of ionizing radiation comprising a measurement chamber and a light sensor, wherein the measurement chamber is filled with a fluorophore and is lightproof, such that no light from the surroundings can be incident in the measurement chamber, and wherein the light sensor is configured to detect fluorescent light generated by ionizing radiation in the fluorophore in the measurement chamber and to generate a signal that is proportional to the fluence of the detected fluorescent light, wherein the light sensor has a response time of less than 10 ns.

2. The dosimeter according to claim 1, wherein the fluorophore is a gas.

3. The dosimeter of claim 2, wherein the gas is air, argon, or nitrogen.

4. The dosimeter according to claim 1, wherein the light sensor is a photomultiplier or a semiconductor detector.

5. The dosimeter according to claim 4, wherein the light sensor has a response time of less than 5 ns.

6. The dosimeter according to claim 1, wherein the measurement chamber is formed from a metal or a plastic.

7. The dosimeter according to claim 1, wherein the measurement chamber is formed from a carbon fibre-reinforced plastic.

8. The dosimeter according to claim 1, wherein a light source for calibrating the light sensor is arranged in the measurement chamber.

9. The dosimeter according to claim 1, wherein the light sensor comprises at least one optical attenuator which can be arranged in the measurement chamber such that the fluence of the fluorescent light incident on the light sensor is reduced by the optical attenuator.

10. The dosimeter according to claim 1, wherein the measurement chamber is configured such that a volume of the measurement chamber can be changed in order to change a sensitivity of the dosimeter.

11. The dosimeter according to claim 1, wherein the dosimeter is embodied such that a pressure of the gas in the measurement chamber can be changed in order to change a sensitivity of the dosimeter.

12. The dosimeter according to claim 1, wherein besides the fluorophore a scintillator is arranged in the measurement chamber and wherein the light sensor is configured to detect scintillation light generated by ionizing radiation in the scintillator and to generate a signal that is proportional to the fluence of the detected scintillation light.

13. The dosimeter according to claim 12, wherein the dosimeter comprises a screen, which can be arranged between the scintillator and the light sensor, such that no scintillation light generated by ionizing radiation in the scintillator is detected by the light sensor.

14. A method of using dosimeter comprising a measurement chamber and a light sensor, wherein the measurement chamber is filled with a fluorophore and is lightproof, and wherein the light sensor is configured to detect fluorescent light generated by ionizing radiation in the fluorophore in the measurement chamber and to generate a signal that is proportional to the fluence of the detected fluorescent light, the method, comprising:
using the dosimeter for measuring a radiation dose of a pulsed ionizing radiation having radiation pulses having a length of less than 10 ns, wherein the ionizing radiation has an energy of more than 8 keV.

15. The method of claim 14, wherein the ionizing radiation is gamma radiation having an energy of more than 10 keV.

16. The method of claim 15, wherein the pulses have a length less than 5 ns.

17. The method of claim 15, wherein the pulses have a length less than 1 ns.

18. The method of claim 14, wherein the pulses have a length less than 5 ns.

19. The method of claim 14, wherein the pulses have a length less than 1 ns.

20. A spectrometer for determining an energy-dependant radiation dose for ionizing radiation with an initial energy spectrum comprising a plurality of dosimeters, each dosimeter comprising a measurement chamber and a light sensor, wherein the measurement chamber is filled with a fluorophore and is lightproof, and wherein the light sensor is configured to detect fluorescent light generated by ionizing radiation in the fluorophore in the measurement chamber and to generate a signal that is proportional to the fluence of the detected fluorescent light, wherein a wall of the measurement chamber of each dosimeter of the plurality of dosimeters has different absorption properties than a wall of at least one other dosimeter of the plurality of dosimeters, such that the ionizing radiation which generates fluorescent light in the measurement chamber of the respective dosimeter has an energy spectrum which differs both from the initial energy spectrum and from the energy spectrum of the ionizing radiation which generates fluorescent light in the measurement chamber of the at least one dosimeter having a wall having deviating absorption properties.

21. The spectrometer according to claim 20, wherein the wall of the measurement chamber of every dosimeter of the plurality of dosimeters has absorption properties which deviate from the absorption properties of the wall of the measurement chamber of every other dosimeter of the plurality of dosimeters.

22. The spectrometer according to claim 20, wherein the walls of the measurement chambers of the plurality of dosimeters are formed from identical materials and deviating absorption properties are produced by deviating dimensions of the walls.

23. The spectrometer according to claim 20, wherein the walls of the measurement chambers of the plurality of dosimeters are formed from different materials and have deviating absorption properties.

24. A dosimeter for measuring a radiation dose of ionizing radiation comprising a measurement chamber and a light sensor, wherein the measurement chamber is filled with a fluorophore and is lightproof, such that no light from the surroundings can be incident in the measurement chamber, and wherein the light sensor is configured to detect fluorescent light generated by ionizing radiation in the fluorophore in the measurement chamber and to generate a signal that is proportional to the fluence of the detected fluorescent light, wherein the measurement chamber is configured such that a volume of the measurement chamber can be changed in order to change a sensitivity of the dosimeter.

25. A dosimeter for measuring a radiation dose of ionizing radiation comprising a measurement chamber and a light sensor, wherein the measurement chamber is filled with a fluorophore and is lightproof, such that no light from the surroundings can be incident in the measurement chamber, and wherein the light sensor is configured to detect fluorescent light generated by ionizing radiation in the fluorophore in the measurement chamber and to generate a signal that is proportional to the fluence of the detected fluorescent light, wherein the dosimeter is embodied such that a pressure of the gas in the measurement chamber can be changed in order to change a sensitivity of the dosimeter.

26. A dosimeter for measuring a radiation dose of ionizing radiation comprising a measurement chamber and a light sensor, wherein the measurement chamber is filled with a fluorophore and is lightproof, such that no light from the surroundings can be incident in the measurement chamber, and wherein the light sensor is configured to detect fluorescent light generated by ionizing radiation in the fluorophore in the measurement chamber and to generate a signal that is proportional to the fluence of the detected fluorescent light, wherein besides the fluorophore a scintillator is arranged in the measurement chamber and wherein the light sensor is configured to detect scintillation light generated by ionizing radiation in the scintillator and to generate a signal that is proportional to the fluence of the detected scintillation light, and wherein the dosimeter comprises a screen, which can be arranged between the scintillator and the light sensor, such that no scintillation light generated by ionizing radiation in the scintillator is detected by the light sensor.

* * * * *